(12) United States Patent
Linnell et al.

(10) Patent No.: US 9,223,192 B1
(45) Date of Patent: Dec. 29, 2015

(54) GENERATING LIGHT DISPLAYS USING DROPS OF A FLUID

(71) Applicant: Bot & Dolly, LLC, San Francisco, CA (US)

(72) Inventors: Jeffrey Linnell, San Francisco, CA (US); Marek Michalowski, San Francisco, CA (US)

(73) Assignee: Bot & Dolly, LLC, San Francisco, CA (US)

( * ) Notice: Subject to any disclaimer, the term of this patent is extended or adjusted under 35 U.S.C. 154(b) by 139 days.

(21) Appl. No.: 14/198,574

(22) Filed: Mar. 5, 2014

(51) Int. Cl.
*G03B 21/14* (2006.01)
*G03B 21/12* (2006.01)
*G03B 21/608* (2014.01)
*F21W 121/02* (2006.01)

(52) U.S. Cl.
CPC .............. *G03B 21/12* (2013.01); *G03B 21/608* (2013.01); *F21W 2121/02* (2013.01)

(58) Field of Classification Search
CPC ... G03B 21/16; G03B 21/608; F21W 2121/02
USPC .......... 353/31, 88, 97, 119, 121, 122; 239/18, 239/20, 557, 502, 566; 359/458, 449, 359/462–478
See application file for complete search history.

(56) References Cited

U.S. PATENT DOCUMENTS

| 4,294,406 | A | 10/1981 | Pevnick |
| 5,165,580 | A | 11/1992 | Rosenthal |
| 5,736,969 | A | 4/1998 | Kuga et al. |
| 6,021,960 | A | 2/2000 | Kehat |
| 6,644,768 | B2 | 11/2003 | Vega et al. |
| 7,401,924 | B2 | 7/2008 | Reichart |
| 7,775,457 | B2 | 8/2010 | Schnuckle |
| 8,328,367 | B2 * | 12/2012 | Nemeth ............... G03B 21/608 353/119 |
| 8,333,331 | B1 | 12/2012 | Fuller et al. |
| 8,556,190 | B2 | 10/2013 | Tom et al. |
| 2013/0308064 | A1 * | 11/2013 | LaDuke ............... G03B 21/608 348/744 |

OTHER PUBLICATIONS amazon.com, "ALFI Brand LED5008 12-Inch Square Multi Color LED Rain Shower Head", first available Aug. 3, 2011.
J. Holben, "Additive and Subtractive Color Mixing", TV Technology web site, Sep. 6, 2013.
L. Liddane, "Behind the Scenes at World of Color", Orangecounty.com, Updated on Oct. 6, 2010.

(Continued)

*Primary Examiner* — Sultan Chowdhury
(74) *Attorney, Agent, or Firm* — McDonnell Boehnen Hulbert & Berghoff LLP

(57) ABSTRACT

Systems and methods are provided for generating light displays using fluids, such as water. An example system can include a plurality of nozzles, a light projector, a shutter, and a control system. Each nozzle can emit a sequence of drops of a fluid that travel along a corresponding path. The light projector can generate light beam(s) that illuminate a display area of the sequences of drops. The shutter can operate at a shutter frequency determined to cause the light beam(s) to intermittently illuminate a position of a corresponding path of a sequence of drops within the display area such that the sequence of drops appears to be a fixed, illuminated drop at the position. The control system can: generate timing information for emission of sequence(s) of drops, determine the shutter frequency based on the timing information, and operate the shutter at the shutter frequency.

26 Claims, 8 Drawing Sheets

(56) References Cited

OTHER PUBLICATIONS

Mumford Micro Systems, "Drip Kit for the Time Machine", May 5, 2013.
Sanctous, "LED Rainbow Shower Head", Oct. 4, 2012.
Wikimedia Foundation, Inc., "Active Shutter 3D System", Nov. 23, 2013.
Wikimedia Foundation, Inc., "World of Color", Feb. 23, 2014.

* cited by examiner

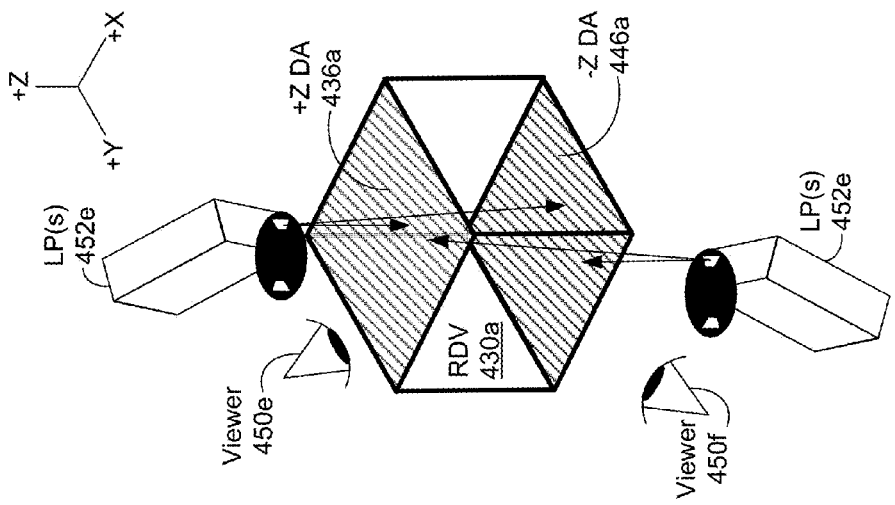
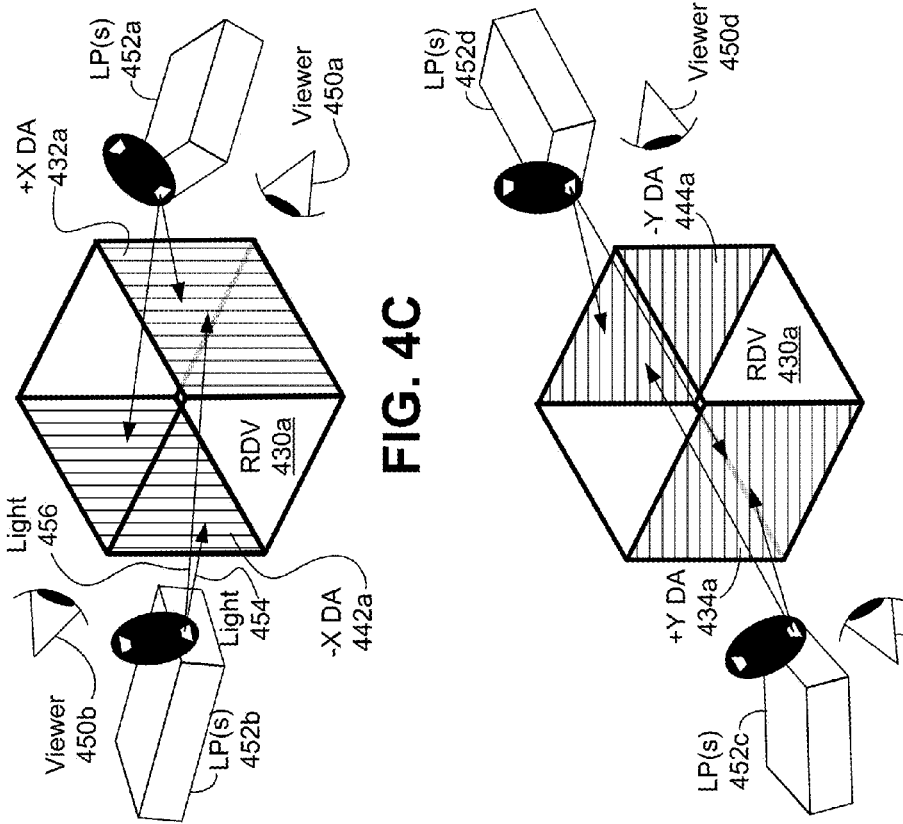
FIG. 4C
FIG. 4D
FIG. 4E

GENERATING LIGHT DISPLAYS USING DROPS OF A FLUID

BACKGROUND

Images are frequently displayed on a variety of surfaces, such as electronic screens, other screens (e.g., movie screens), canvases, and papers. The images can be actively lighted; that is, displayed by use of light being directed onto a display surface, such as done with many electronic screens, or passively lighted; that is, displayed by use of reflection of ambient light from the display surface, such as done when light is reflected from a paper-based or canvas-based image into an eye of the viewer. In some cases, like still pictures and paintings, the image can be a static image; while in other cases, such as movies and video, a displayed image can be a moving image in a sequence of images that appear to show motion.

SUMMARY

Drops of fluids, such as water, can be used to display images for an immersive viewing experience. For example, a display surface may be created using a number of droppers suspended above the ground. Each dropper can periodically release a sequence of drops of fluid to travel along the same path. Once released, one or more drop sequences can be illuminated by an intermittent light source, e.g., a constant light source periodically interrupted by a shutter operating at a shutter frequency. The intermittent light source can generate flashes of light; i.e., bursts of light, at an appropriate rate to cause the drops to appear to be fixed in place during the flash of light. Then, the intermittently-illuminated and apparently-fixed drops in the drop sequences can act as a display surface for the light emitted during the flashes. Using the intermittent light source, still and/or moving images can be projected onto one or more display surfaces formed by the drop sequences. As the display surfaces are made of drops of fluid, a viewer can travel through some or all of the display surfaces to enjoy the immersive viewing experience.

In a first aspect, a system is provided. The system includes a plurality of nozzles, a light projector, a shutter for the light projector, and a control system. Each nozzle of the plurality of nozzles is configured to emit a sequence of drops of a fluid that travel along a corresponding path. The light projector is configured to generate at least one light beam for illuminating a display area of the plurality of sequences of drops. The shutter is configured to operate at a shutter frequency to intermittently block the at least one light beam from illuminating the display area. The control system is configured to generate timing information based on emission of at least one sequence of drops from at least one nozzle, determine the shutter frequency based on the timing information, and operate the shutter at the shutter frequency. Operation of the shutter at the shutter frequency causes the at least one light beam to intermittently illuminate a position in a corresponding path of at least one sequence of drops within the display area, such that a sequence of drops traveling along the corresponding path creates an appearance of a single illuminated drop fixed at the position.

In a second aspect, a method is provided. A plurality of nozzles generates a plurality of sequences of drops. Each nozzle is configured to emit a sequence of drops of a fluid that travel along a corresponding path. Timing information is generated that is based on emission of at least one sequence of drops emitted from at least one nozzle. A light projector generates at least one light beam for illuminating a display area of the plurality of sequences of drops. A shutter frequency is determined for a shutter of the light projector based on the timing information, where the shutter is configured to operate at the shutter frequency to intermittently block the at least one light beam. The shutter frequency is determined so that the at least one light beam intermittently illuminates a position in a corresponding path of at least one sequence of drops within the display area, such that a sequence of drops traveling along the corresponding path creates an appearance of a single illuminated drop fixed at the position. The shutter is operated at the shutter frequency.

In a third aspect, a system is provided. The system includes means for generating a plurality of sequences of drops using a plurality of drop-emitting means, where each drop-emitting means is configured to emit a sequence of drops of a fluid that travel along a corresponding path; means for generating timing information based on emission of at least one sequence of drops emitted from at least one drop-emitting means; means for generating at least one light beam for illuminating a display area of the plurality of sequences of drops using light-projection means, where the light-projection means is configured to generate at least one light beam; means for determining a shutter frequency for shutter means of the light-projection means based on the timing information, where the shutter means is configured to operate at the shutter frequency to intermittently block the at least one light beam, and where the shutter frequency is determined so that the at least one light beam intermittently illuminates a position within the display area including at least one sequence of drops, such that a sequence of drops of the at least one sequence of drops traveling along a corresponding path creates an appearance of a single illuminated drop fixed at the position; and means for operating the shutter means at the shutter frequency.

BRIEF DESCRIPTION OF THE FIGURES

FIG. 4C is a diagram of displaying images on X-axis oriented display areas of a display volume, accordance with an example embodiment.

FIG. 4D is a diagram of displaying images on Y-axis oriented display areas of a display volume, in accordance with an example embodiment.

FIG. 4E is a diagram of displaying images on Z-axis oriented display areas of a display volume, in accordance with an example embodiment.

DETAILED DESCRIPTION

I. Overview

Figure 1:
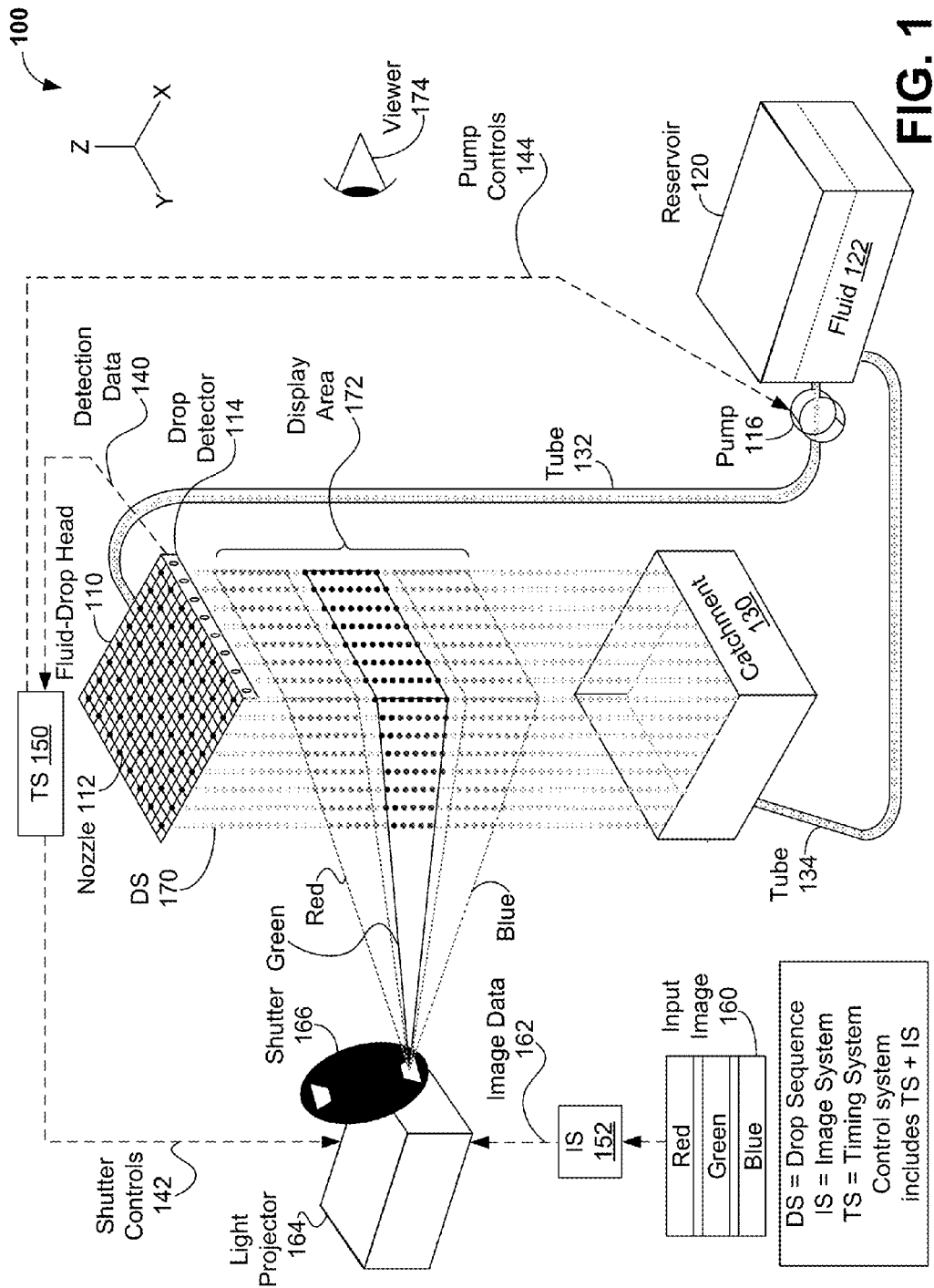
FIG. 1 is a diagram of a system for displaying light onto streams of drops of a fluid, in accordance with an example embodiment.

Arrangements of various materials, such as drops of fluid, can be illuminated to act as display surfaces as images as part of an immersive viewing experience. For example, a display surface may be created using a number of droppers, such as nozzles, suspended above the ground. Each nozzle can periodically release drops of fluid, which fall downward along the same path towards the ground. Collectively, a sequence of drops that are periodically released from the same dropper and fall along the same path towards the ground may be referred to as a drop sequence. The nozzles can be controlled to emit the drops in a drop sequence at a constant rate or a nearly constant rate; e.g., 20 drops per second.

Once released by the droppers, drops in drop sequences can be illuminated by an intermittent light source, e.g., a constant light source periodically interrupted by a shutter operating at a shutter frequency. The intermittent light source can generate flashes of light; i.e., bursts of light. The light flashes can be generated at an appropriate rate to cause the drops to appear to be at a fixed location during the flash of light due to the stroboscopic effect. Then, the intermittently-illuminated and apparently-fixed drops can act as a display surface for the light emitted during the flashes. Using the intermittent light source, still and/or moving images can be projected onto one or more display surfaces formed by the drop sequences. Once the display surfaces are illuminated with images, a viewer can view the images displayed on different display surfaces. As the display surfaces are made of drops of fluid, the viewer can travel through some or all of the display surfaces to enjoy the immersive viewing experience.

Controls can be provided to determine and adjust the shutter frequency as needed based on observed features of drops in the drop sequences. For example, one or more drop detectors can sense emission of individual drops from the plurality of nozzles. The drop detectors can generate timing information, such as a drop rate of drops in a drop sequence and/or an amount of time between drops. The timing information can be provided to a control system.

Based on the timing information, the control system can adjust the shutter frequency, and therefore control the intermittent light source. For example, if a sequence of drops travels at a drop rate of D drops per second, the intermittent light source can generate light flashes at a rate based the drop rate. The shutter frequency SF can determine the interval between illuminations and therefore the distance that each drop travels before it is once again illuminated. If SF is an integer divisor of the drop rate D; e.g., if D/SF is an integer value greater than 0, then drops in a drop sequence can appear to be stationary. Additionally, small adjustments to shutter frequency SF can make drops in a drop sequence appear to slowly rise or fall In some cases, a pump pushes fluid to the plurality of nozzles, where the nozzles emit drops in the drop sequences. In these cases, the control system can also adjust a flow rate of the fluid to the nozzles, and so control the drop rate D.

Images that reach the human eye persist for a short period of time; e.g., approximately $1/25^{th}$ of a second. This persistence of vision is used make sequences of separate images (e.g., movies, videos) appear to move by displaying a certain number of images per second. Images that are displayed at a persistence-of-vision rate or above; e.g., at least 16 images per second, cause the mind to perceive motion between images without being distracted by apparent flicker between images. Therefore, typical modern films display images at a rate of at least the persistence-of-vision rate and often faster; e.g., 24, 32, 60, or even 120 images per second.

A herein-described system can generate drops in a number of drop sequences DS1, DS2, . . . each drop sequence including drops traveling at the drop rate D; e.g., D=60. The system can have or coordinate with a light projector configured to generate an intermittent light flashing at a shutter frequency of D/M times per second, for integer >0, so that each $M^{th}$ drop in drop sequences DS1, DS2 . . . can appear to be fixed in position. Then the light shined onto the apparently-fixed drops can be reflected, perhaps toward a viewer, so that the viewer can observe the light shined on the apparently-fixed drops.

In some cases, each flash of light can illuminate a different image. Images intermittently displayed on to the drops above the persistence-of-vision rate discussed above can appear to be non-flickering moving images. Therefore, when the drops in the drop sequences DS1, DS2 . . . are illuminated at a shutter frequency of above the persistence-of-vision rate, the drops can act as a display surface for video imagery. If the shutter frequency is below the persistence-of-vision rate, the drops in the drop sequences DS1, DS2 . . . can act as a display surface for other images; e.g., still imagery.

Thus, in an example embodiment, a display surface may be collectively provided by a number of drop sequences that fall along parallel paths towards the ground. For example, a two-dimensional (2D) array of nozzles can generate a 2D array of traveling drop sequences and a three-dimensional (3D) volume of drops. This 3D volume can have multiple display areas e.g., front, back, left, right, upper, and lower display areas, for a 3D cube or rectangular prism traversed by drops in the drop sequences. In sonic cases, the images can be displayed in a 3D display volume within the 3D cube or rectangular prism. A viewer can walk into the 3D volume and see additional images, such as different images displayed on different 2D display surfaces, and/or different perspectives of 2D or 3D images displayed within a display volume.

Further, the entirety of the volume of drops can act as a 3D volumetric display in which objects/shapes that have volume can be projected and animated, much like a hologram. For example, all of the drops can be colored blue by the projected light except for one or more clusters of yellow drops that depict 3D goldfish swimming through the volume of the cube. A viewer can see the 3-dimensionality of the projected object through his/her stereo vision as well as by walking around, and perhaps through, the volume of drops.

To display imagery of 2D or 3D objects, such as the goldfish mentioned immediately above, the intermittent light source can project a 2D image onto the volume of drops. The 2D image can be generated based on a 2D or 3D animation of the 2D or 3D objects. Software in the control system can control the intermittent light source to project a 2D image onto the volume of drops to result in perception of the 2D or 3D animation by a viewer looking at the volume of drops. For example, the software can control the intermittent light source based on knowledge of locations of individual drops within the volume of drops and of how light from the 2D image can be perceived as 2D or 3D objects when projected onto individual drops.

The use of drop-based display surfaces and volumes may also enable generation of visual effects to images displayed on drops in drop sequences. Further, display surfaces based on traveling drops of liquid are not persistent and can be readily removed by shutting off the fluid flow generating the traveling drops. The use of 3D image volumes can enable displays of 2D and 3D objects, including animated 2D and 3D objects. Therefore, temporary visual displays can be generated using drops of fluid; e.g., for performances, art exhibits, or other reasons for visual display.

II. Systems and Techniques for Generating Light Displays Using Drops of a Fluid

FIG. 1 is a diagram of system 100 for displaying light onto streams of drops of a fluid, in accordance with an example embodiment, using light projector 164 configured to emit light onto individual drops with display area 172 to portray still and/or moving images on the display area System 100 includes a fluid-drop head 110 configured to emit one or more sequences of drops of a fluid, such as drop sequence 170 shown in FIG. 1. Fluid-drop head 110 can use a nozzle, such as nozzle 112 indicated as a black dot in fluid-drop head 110, to emit the drops in a drop sequence. As shown in FIG. 1, fluid-drop head 110 can have a plurality of nozzles to emit a plurality of drop sequences. Nozzles, such as nozzle 112, can be arranged as a 2D array of nozzles, such as shown in FIG. 1, or in other patterns; e.g., a 1-dimensional array of nozzles, a circular group of nozzles, a group of nozzles making a pattern such as a pattern of one or more letters, numbers, and/or shapes. Other patterns of nozzles are possible as well.

To generate the drop sequences, fluid 122 stored in reservoir 120 is moved up tube 132 to fluid-drop head 110 using pump 116. Pump 116 can be controlled from timing system (TS) 150 to increase, maintain, or decrease a flow rate of fluid 122 through tube 132. After traveling in tube 132, fluid reaches fluid-drop head 110 and is forced out of the nozzles in fluid-drop head 110 to travel as drops of fluid in drop sequences. After falling or otherwise traveling, the drops of fluid in drop sequences, such as drop sequence 170 shown in FIG. 1, reach catchment 130. The drops of fluid can pool in catchment 130 and be returned to reservoir 120 via tube 134. As such, system 100 can contain fluids, such as fluid 122, within system 100; e.g., fluid 122 can flow from reservoir 120, to fluid-drop head 110 via tube 132, can fall as drops to catchment 130, and can return to reservoir 120 via tube 134.

The drop sequences emitted by fluid-drop head 110 can be used to display light, images, and moving pictures. Regarding the example shown in FIG. 1, input image 160 of a red stripe over a green stripe over a blue stripe can be provided to image system (IS) 152. For example, input image 160 can be a 2D image, such as a 2D image divided into pixels. In other embodiments, input image 160 can be a 3D image, such as a 3D image divided into pixels. Image system 152 can provide image data 162, corresponding to input image 160 to light projector 164. For example, image data 162 can indicate which drop(s) in display area 172 are to be illuminated based on pixels in input image 160. In some embodiments, input data 162 can be generated by software in image system 152. In other embodiments, timing system 150 and image system 152 can be combined into one system; e.g., a control system.

Timing system 150 and/or image system 152 can include (or be) a computing device. The computing device can include one or more processors, and data storage, a user interface module, and a network-communication module, all of which may be linked together via a system bus, network, or other connection mechanism. The one or more processors can include one or more general purpose processors and/or one or more special purpose processors (e.g., digital signal processors, application specific integrated circuits, etc.). The one or more processors can execute computer-readable program instructions stored in the data storage. When executed, the computer-readable instructions can cause the computing device to receive inputs, such as, but not limited to, input image 160 and/or detection data 140, process the inputs, and generate output data, such as, but not limited to, image data 162, shutter controls 142, and/or pump controls 144. The user interface module can be operable to send data to and/or receive data from external user input/output devices. The network-communications module can include one or more wireless interfaces and/or one or more wireline interfaces that are configurable to communicate via one or more networks.

Light projector 164 can be controlled to emit light; e.g., as beam(s) of light, corresponding to image data 162 toward the drop sequences generated by fluid-drop head 110. This light may be visible to a viewer, such as viewer 174, located to view image(s) shown at display area 172. As shown in FIG. 1, display area 172 has an upper section of drops illuminated with red light that corresponds to the red strip of input image 160, a central section of drops illuminated with green light that corresponds to the green strip of input image 160, and a lower section of drops illuminated with blue light that corresponds to the blue strip of input image 160. In some embodiments, light projector 164 can include a computing device.

Light projector 164 can be configured with shutter 166, shown in FIG. 1 as a solid disk with two holes. Shutter 166 can be mounted in front of light projector 166 so that the solid portion of shutter 166 can block light emitted by light projector 166 and the holes in shutter 166 can permit light to pass through shutter 166. In other embodiments, shutter 166 can have more or fewer holes. In still other embodiments, shutter 166 can use other mechanical means to block light; e.g., a blind that can be raised to enable light passage or lowered to block light. In even other embodiments, shutter 166 can utilize a liquid crystal display (LCD) configured to allow light passage or block light passage to perform the herein-describe functions of shutter 166.

Shutter 166 can intermittently block light emitted from light projector 164 toward display area 172, or, in other words, light projector 164 and shutter 166 can cooperatively operate to intermittently emit light toward display area 172. Shutter 166 can be operated at a shutter frequency. In some scenarios, operation of shutter 166 at the shutter frequency can cause light emitted from light projector 166 to intermittently illuminate a position within display area 172. The position can include one or more sequences of drops. The shutter frequency can be selected such that some or all of the sequences of drops at the position can be illuminated so that when drops in the some or all of the sequences of drops travel along corresponding path(s), an appearance can be created where each sequence has a single illuminated drop fixed at the position.

For example, suppose that drops in a drop sequence DS1 that travel at a rate of D drops/second through position P. Then, the shutter frequency can be selected to generate D/M flashes (intermittent illuminations) of light per second from light projector 164, where M is a positive integer. The D/M flashes can illuminate drop sequence DS1 at position P so that the drops traveling at a drop rate of D drops per second appear to be stationary, or fixed in position, due to the stroboscopic effect created by flashes of light generated by operation of light projector 164 and shutter 166. For example, if M=1, each flash of light illuminates each drop traveling through position P. As another example, if M=2, each flash of light illuminates every other drop traveling through position P. Many other examples are possible as well.

Some example systems can include a drop detector 114, shown in FIG. 1 positioned slightly below fluid-drop head 110. Drop detector 114 can have one or more sensors; e.g., one sensor per nozzle of fluid-drop head 110. Each sensor of drop detector 114 can detect when a drop is emitted from a corresponding nozzle fluid-drop head 110. For example, the sensor can be a Hall effect sensor, an optical break-beam sensor, and/or an ultrasonic sensor. Drop detector can provide information about detected drops as detection data 140 to timing system 150. Then, by determining interval(s) of time between detected drop(s) and/or by counting a number of drop(s) detected per unit time, such as drops per second, timing system 150 can determine a drop rate for each nozzle of fluid-drop head 110 and/or a drop rate for fluid-drop head 110; e.g., by determining an average drop rate for all nozzles of fluid-drop head 110.

Timing system 150 can use the drop rate to generate shutter controls 142 and/or pump controls 144. For example, if the drop rate changes from D1 to D2 drops/second, timing system 150 can generate shutter controls 142. The shutter controls 142 can change operation of light projector 164 and/or shutter 166 to emit D2/M2 flashes of light/second, where M2 is a positive integer.

Continuing this example, timing system 150 also can generate pump controls 144 based on the change of drop rate to D2. For example, if the change in drop rate from D1 to D2 adversely affects viewer 174's viewing experience, timing system 150 can generate pump controls 144 to change operation of pump 116; e.g., speed up or slow down pump 116, to change the drop rate back to D1. Other shutter controls 142 and/or pump controls 144 can be generated by timing system 150 as well.

Figure 2A:
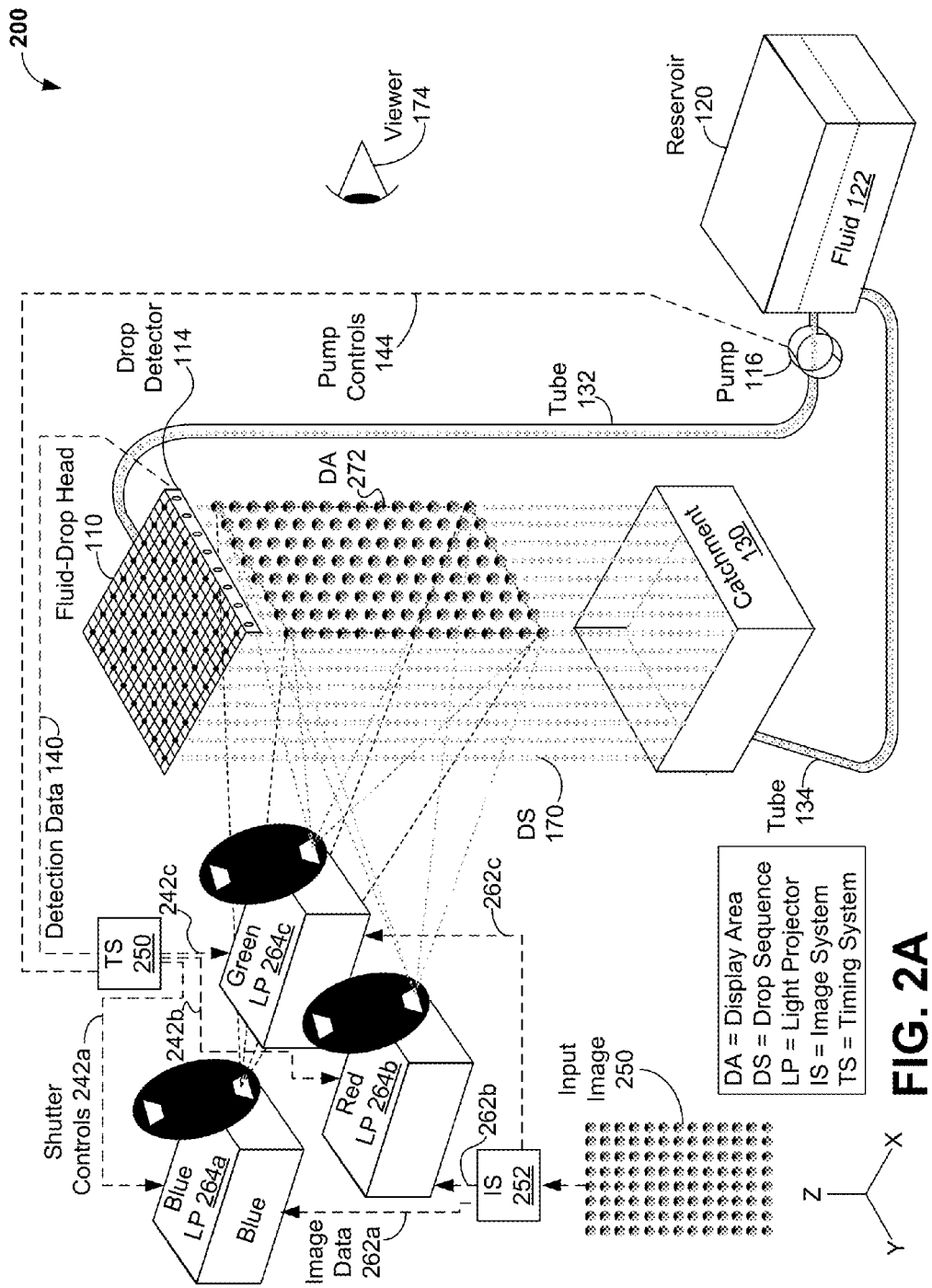
FIG. 2A is a diagram of a system for displaying light onto streams of drops of a fluid in a display area, in accordance with an example embodiment.

FIG. 2A is a diagram of system 200 for displaying light onto streams of drops of a fluid in display area 272, in accordance with an example embodiment, using multiple light projectors 264a, 264b, 264c configured to emit light of different colors onto individual drops of display area 272 to portray still and/or moving images on the display area. As shown in FIG. 2A, system 200 includes many of the fluid-related components of system 100; e.g., fluid-drop head 110, drop detector 114, pump 116, reservoir 120, fluid 122, catchment 130, tubes 132 and 134.

System 200 includes multiple light projectors (LPs), shown in FIG. 2A as light projectors 264a, 264b, and 264c. Each light projector 264a, 264b, and 264c also has a corresponding shutter. Each of light projectors 264a, 264b, 264c and corresponding shutters can generate intermittent flashes of light based on respective shutter controls 242a, 242b, 242c, such as discussed above in the context of light projector 164, shutter 166, and shutter controls 142 of FIG. 1. Timing system 250 can provide shutter controls 242a, 242b, 242c to each of respective light projectors 264a, 26.4b, and 264c, such as discussed above in the context of timing system 150 of FIG. 1. Also, image system 252 can provide image data 262a, 262b, 262c to each of respective light projectors 264a, 264b, and 264c based on input image 250, such as discussed above in the context of timing system 150 of FIG. 1. In other embodiments, system 200 can include less than or more than the three light projectors shown in FIG. 2A.

Light projectors 264a, 264b, and 264c can each be configured to illuminate drops of light at position(s) within drop sequences generated by fluid-drop head 110 to generate a display of input image 250 onto drops passing through display area 272 for view by viewer 174. FIG. 2A shows that drops in display area 272 are illuminated with three colors of light, corresponding to three colors of light generated by light projectors 264a, 264b, and 264c. For example, a drop in display area 272 can be illuminated using: blue light generated by light projector 264a, labeled in FIG. 2A as "Blue LP 264a", red light generated by light projector 264b, labeled in FIG. 2A as "Red LP 264b", and green light generated by light projector 264c, labeled in FIG. 2A as "Green LP 264c". As such, drops of light in display area 272 can be illuminated with multiple colors of light simultaneously.

Light projector(s), such as light projectors 164, 264a, 264b, and/or 264c, can be used to project either a 2D image onto a display area made up of drops of fluid or to project 3D images onto a display volume made up of drops of fluid. The system can include software, such as software in image system 152 and/or image system 252, configured to determine information about the location of each drop of the drops of fluid in 3D space and extrinsic and intrinsic parameters of the projector(s).

The software can use this information to map a desired volumetric image and/or animation into a 2D image or a 3D image to be projected onto a volume of drops. Then, for each 2D pixel or 3D voxel of the image, the software can control the light projector(s) so that light for a projected pixel or voxel of the image can be shone onto the appropriate drop at the appropriate 3D location. The system can be calibrated using motion capture technology, laser localization, or some technique so that pixels or voxels can be accurately mapped onto drops in the display area or display volume. Then, light for image pixels or voxels can be accurately projected onto the appropriate one or more drops of the volume of drops.

Figure 2B:
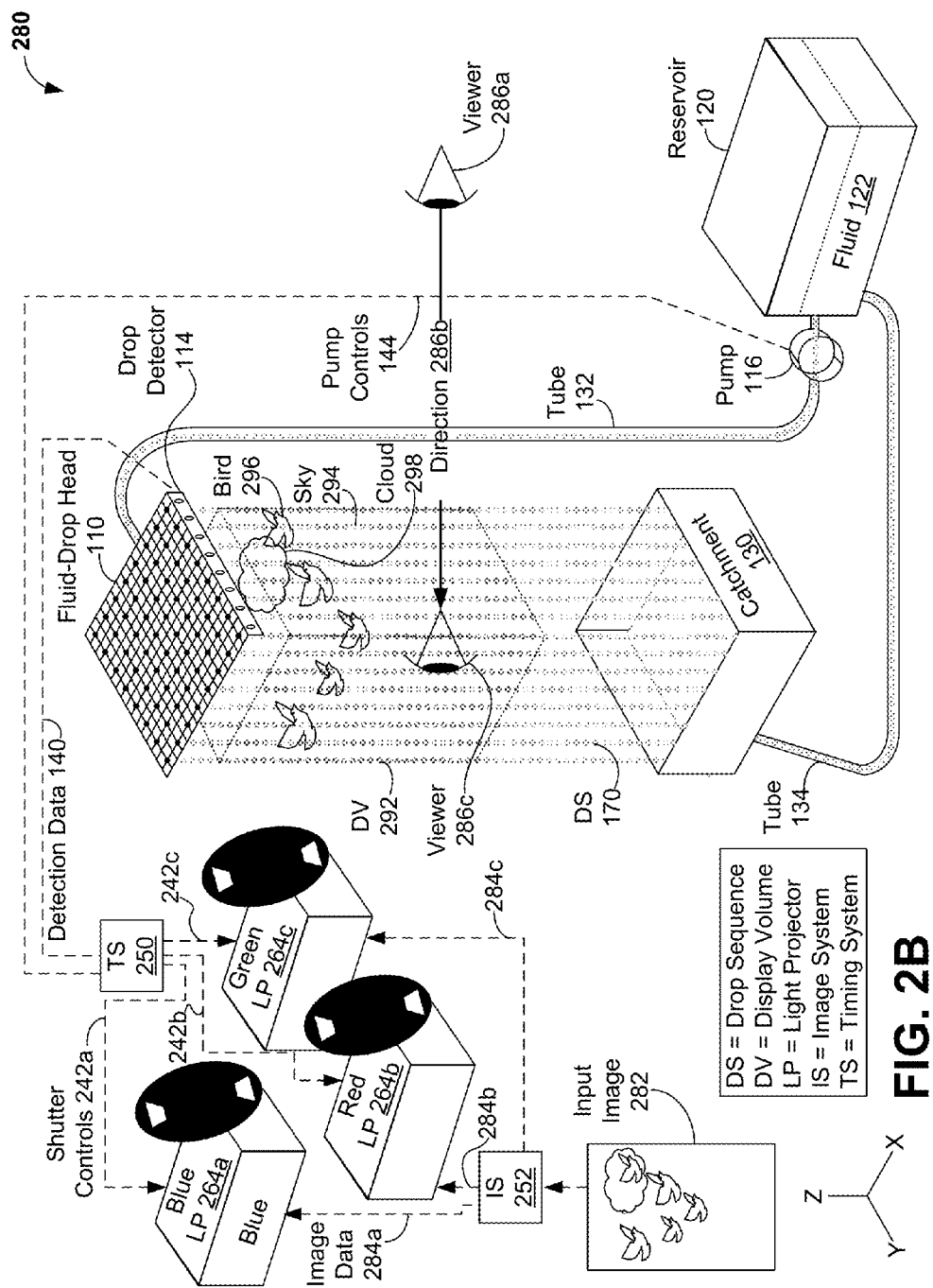
FIG. 2B is a diagram of a system for displaying light onto streams of drops of a fluid in a display volume, in accordance with an example embodiment.

FIG. 2B is a diagram of system 280 for displaying light onto streams of drops of a fluid in display area 282, in accordance with an example embodiment. As shown in FIG. 2B, system 280 includes many common components with system 200; e.g., fluid-drop head 110, drop detector 114, pump 116, reservoir 120, fluid 122, catchment 130, tubes 132 and 134, drop sequences 170, shutter controls 242a, 242b, 242c, timing system 250, and light projectors 264a, 264b, 264c. As with system 200, light projectors 264a, 264b, 264c in system 280 are configured to emit light of different colors onto individual drops, but in system 280, light projectors 264a, 264b, 264c project light onto drops of display area 292 to portray still and/or moving images on the display area. The common components in system 280 can perform the same functions as discussed above in the context of system 200 in FIG. 2B.

Image system 252 can provide image data 284a, 284b, 284c to each of respective light projectors 264a, 264b, and 264c based on input image 282. In system 280, input image 282 can be a 2D image that can be divided into pixels or a 3D image that can be divided into voxels. The pixels or voxels can be mapped into drops in display volume (DV) 292. For example, image system 252 can generate image data 284a, 284b, 284c that controls light projectors 264a, 264b, 264c to shine light onto drops in display volume 292 based on pixels or voxels of input image 282.

In some embodiments, image system 252 can generate image data 284a, 284b, 28'1c that maps pixels or voxels of input image 160 on to one or more 2D surfaces of display volume 292; e.g., a display area such as display areas 172 or 272. In other embodiments, such as shown in FIG. 2B, image system 252 can generate image data 284a, 284b, 284c that maps pixels or volumes into a 3D volume, bounded by or otherwise related to display volume 292. In these embodiments, if viewer 174 moves to enter into display volume 292, viewer 286a can see aspects of input image 282, such as sky 294, bird 296, or cloud 298 as 3D objects; e.g., viewer 286a can see cloud 298 behind bird 296 as shown in FIG. 2B. Viewer 286 can move to obtain a different perspective on input image 282 as projected onto display volume 292. For example, if viewer 286a moves in direction 286b to the position of viewer 286c inside display volume 292, the viewer can see bird 296 and cloud 298 projected in display volume 272 above the viewer, and perhaps see that bird 296 is closer to the position of viewer 286a than cloud 298.

In other embodiments, one or more of projectors 264a, 264b, 264c can project some or all of image data 284a, 284b, 284c onto drop volume 292, where image data 284a, 284b, 284c is based on a high-resolution 2D input image 282. Input image 282 can be better perceived in a 3D volume, such as drop volume 292, rather than on a 2D plane, such as a conventional movie screen—for example, input image 282 can be generated as an image of 3D objects in a 3D environment. To create the perception of 3D objects in a 3D environment from 2D input image 282, timing system 250 and/or image system 252 can generate a display based on information about locations of individual drops in drop volume 292 and intrinsic/extrinsic parameters of one or more of projectors 264a, 264b, 264c. The generated display can result in perception of a 3D objects in a 3D environment by a viewer, such as viewer 286a or 286b, when the generated display is projected onto drop volume 292.

For example, a desired 3D (or 2D) animation can be modeled by describing the movement of shapes and volumes in a 3D space (or in a 2D space). The 3D animation can be generated using a 3D game engine, using 3D animation software, such as the Maya® 3D animation software package from Autodesk, Inc. of San Rafael, Calif., or by using a parametric and/or programmatic design language and/or supporting software. The resulting 3D volumes might be represented as voxels, mesh surfaces, Non-Uniform Rational Basis Splines (NURBS), or using some other 3D representation. 2D shapes can be represented as pixels or some other 2D or perhaps 3D representation.

Once the 3D (or 2D) animation is available, the modeled shapes/volumes in the 3D (or 2D) animation can be sampled based on knowledge of drop density within drop volume 292, dimensions of drop volume 292, and other information; e.g., rate of drop generation, properties of fluid 122 making up drops in drop volume 292. Sampling of the 3D (or 2D) shapes/volumes can be based on intrinsic and extrinsic parameters one or more of projectors 264a, 264b, 264c.

Example intrinsic parameters of one or more of projectors 264a, 264b, 264c include parameters for focal length, image format, principal point, and lens distortion. Example extrinsic parameters of one or more of projectors 264a, 264b, 264c include parameters for the position of the camera/projector center and heading in world coordinates, such as but not limited to coordinate system transformations from 3D world coordinates to 3D camera/projector coordinates and coordinate system transformations from 3D camera/projector coordinates to 3D world coordinates. Other examples of the intrinsic and extrinsic parameters of a projector include, but are not limited to, color(s) of light generated by the projector, maximum/minimum brightness of light generated by the projector, parameters about a light cone or other volume projected by the projector onto drop volume 292, parameters about the geometry of the projector, drop volume 292, viewer and other objects in a space where input image 282 is to be displayed, parameters about lighting in the space where input image 282 is to be displayed, parameters about fluid 122, drops in drop volume 292, and a shutter for the projector. In some embodiments, samples of the modeled shapes/volumes in the 3D (or 2D) animation can be associate with regions or pixels of the input image.

Further, a pixel/drop mapping of pixels to relate pixels (or voxels) of the input image to drops in drop volume 292 can be determined. The pixel/drop mapping can relate which pixels (or voxels) PI from input image 282 will illuminate drops DV in drop volume 292, when input image 282 is projected onto drop volume 292 by one or more of projectors 264a, 264b, 264c. Then, the mapping can relate: one or more pixels in PI with a drop in DV, a pixel in PI with one or more drops in DV, and/or relate a pixel in PI with a drop in DV. The pixel/drop mapping can further be based on some or all of the intrinsic and extrinsic parameters mentioned immediately above.

Then, discretized 3D color information determined from the samples from the 3D (or 2D) shapes/volumes can be used to assign color values of pixels selected based on the pixel/drop mapping. For example, suppose a red object is in the 3D (or 2D) animation and a sample S1 of the red object has a color of (255, 0, 0) as expressed in red-green-blue format. Further suppose the pixel/drop mapping indicates that sample S1 is to be displayed at pixels (0, 0), (1, 1), (1, 0), and (1, 1) of an image. Then, pixels (0, 0), (1, 1), (1, 0), and (1, 1) of the image can each be assigned with a color of (255, 0, 0)=the color of S1.

Once the image is generated, the generated image can be provided to system 280 as input image 282 for projection by one or more of projectors 264a, 264b, 264c onto drops of drop volume 292. For example, projectors 264a, 264b, 264c can be controlled based on the pixel/drop mapping to emit light onto a particular drop of drop volume 292, where the light has the color(s) of pixel(s) of input image 282 mapped onto the particular drop. A viewer, such as viewer 286a or 286c, can then perceive a portion of the 3D (or 2D) animation after input image 282 is projected onto drop volume 292. In some scenarios, input image 282 can be provided to system 280 as a stream of image-related data, so input image 282 may not be completely generated before being provided, at least in part, to system 280.

Figure 3A:
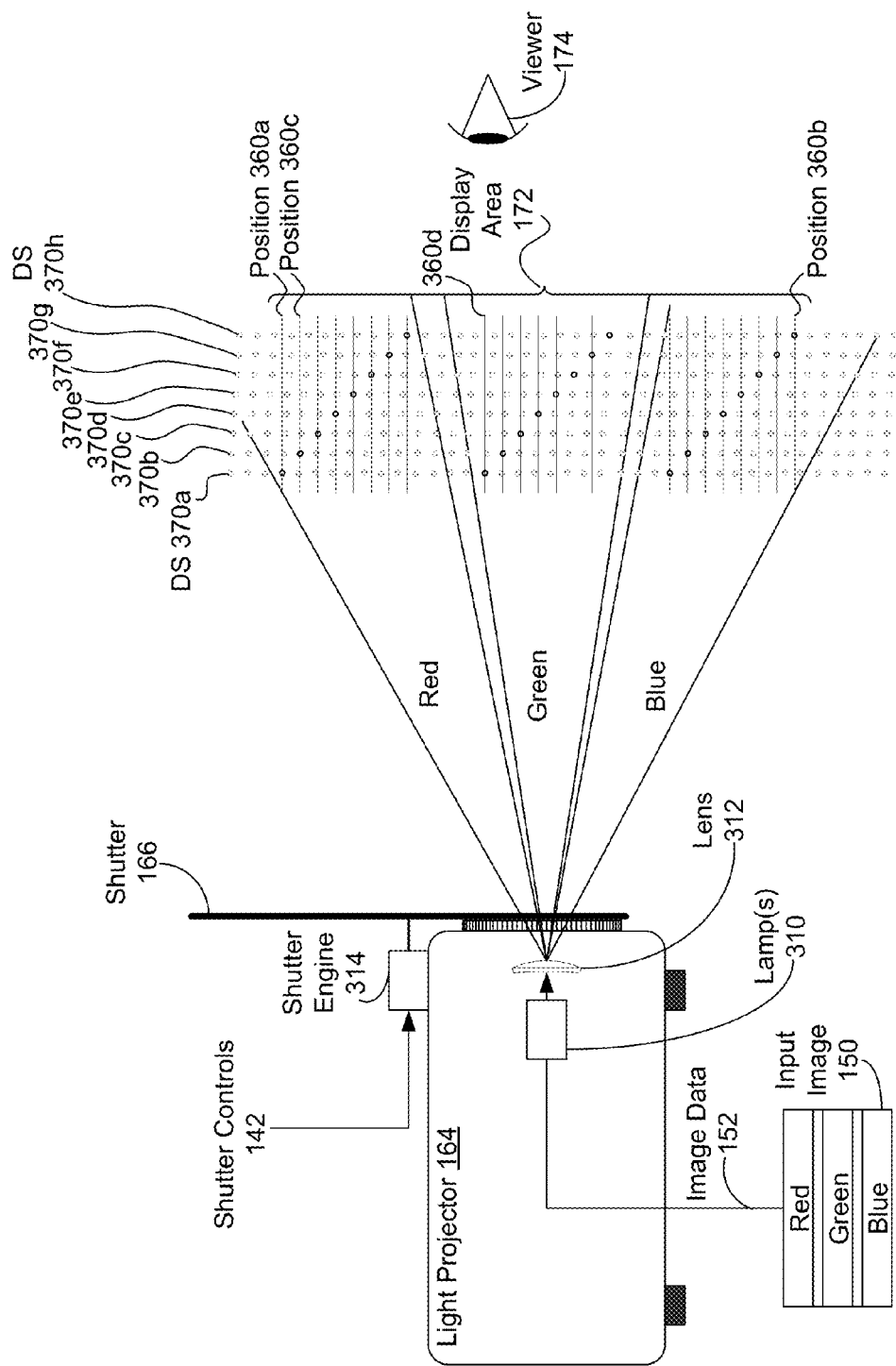
FIG. 3A is a diagram of a light projector, in accordance with an example embodiment.

FIG. 3A is a diagram of light projector 164, in accordance with an example embodiment, showing details of light projector 164. Light projector 164 can include shutter 166, lamp(s) 310, lens 312, and shutter engine 314. Shutter 166 is discussed above in detail in the context of at least FIG. 1. Lamp(s) 310 include one or more light sources, with each light source configured to emit at least one color of light through lens 312 toward display area 172 and viewer 174. The one or more light sources can include, but are not limited to light bulbs, light emitting diodes (LEDs), LCDs, lasers, laser diodes, black lights, fluorescent lamps, cathode ray tubes (CRTs), gas discharge lamps, electroluminescent lamps, high-intensity discharge lamps, incandescent lamps, and electron-stimulated lamps. Lens 312 can be used to introduce optical properties, such as focusing, spreading, and/or causing aberrations, in light emitted by lamp(s) 310.

For example, FIG. 3A shows lamp(s) 310 emitting red, green, and blue light. The red, green, and blue light emitted by lamp(s) 310 can be controlled by image data 152. For example, image data 152 can provided to a lamp controller (not shown in FIG. 3A) to determine whether or not to cause none, some, or all of lamp(s) 310 to emit light and perhaps color(s) of light to be emitted by lamp(s) 310.

Shutter engine 314 can be used to rotate shutter 166 based on a shutter frequency in accord with shutter controls 142. Shutter controls 142 are discussed above in more detail in the context of FIG. 1. In embodiments where shutter 166 is not present; e.g., an LCD is used rather than shutter 166, to intermittently block light emitted by lamp(s) 310, then shutter controls 142 can be used to control operation of the LCD (or other device substituting for shutter 166) to operate based on the shutter frequency rather than to control shutter engine 314.

Light emitted from lamp(s) 310 and passing through shutter 166 can reach drop sequences 370a-370h. The light can reach drops of different drop sequences at different relative positions within each drop sequence. For example, red light emitted by light projector 164 can reach a drop in drop sequence 370a, shown outlined in black, relatively closer to fluid-drop head 110 than light reaches a drop in drop sequence 370h; i.e., the drop of drop sequence 370b shown in FIG. 3A as illuminated has fallen further from fluid-drop head 110 than the drop of drop sequence 370a shown in FIG. 3A as illuminated. For example, as shown in FIG. 3A, each drop sequence 370a-370h has drops with slightly different starting times; e.g., the starting times are staggered between drop sequences. Then, for all drops that reach a fixed position below fluid-drop head 110, light emitted from lamp(s) 310 can better illuminate a drop from one of drop sequences 370a-370h than from the other sequences.

FIG. 3A shows fixed positions below fluid-drop head 110 within display 172 as thin lines going across drops in drop sequences 370a-370h; e.g. position 360a is an upper-most position shown within display area 372 and position 360h is a lower-most position shown within display area 372. Each drop shown as illuminated in drop sequences 370a-370h can be a drop whose center is at a given fixed position—for example, a red light emitted by lamp(s) 310 illuminates a center of a drop in drop sequence 370a at position 360a, while drops in the other drop sequences 370b-370h have centers below position 360a. As another example, a red light emitted by lamp(s) 310 illuminates a center of a drop in drop sequence 370b at position 360c, while drops in drop sequence 370a have centers above position 360c and drop in drop sequences 370c-370h have centers below position 360c. As such, red light emitted from lamp(s) 310 can illuminate a diagonal line of drops in drop sequences 370a-370h as shown in FIG. 3A.

FIG. 3A shows that drops emitted from fluid-drop head 110 fall through the red light emitted from lamp(s) 310 to reach green light emitted from lamp(s) 310, and then fall further to reach blue light emitted from lamp(s) 310. As the drops in drop sequences 370a-370h have staggered starting times and each are affected by gravity in the same way, green light, and later blue light, emitted from lamp(s) 310 can each illuminate a diagonal line of drops in drop sequences 370a-370h as shown in FIG. 3A. Each of these diagonal lines of drops may appear to viewer 174 to be a solidly-colored region of display area 172; e.g., an upper solidly-red-colored region, a central solidly-green-colored region, and a lower solidly-blue-colored region.

In other scenarios, drops illuminated in drop sequences further from viewer 174; e.g., drop sequences 370a, 370b, can appear to be less color saturated than drops illuminated in drop sequence closer to viewer 174; e.g., drop sequences 370g, 370h, due to less interference to light traveling from closer drops than from further drops. For example, further illuminated drops can have light scattered by drops in closer drop sequences before reaching viewer 174 and so appear to be less saturated to viewer 174.

Figure 3B:
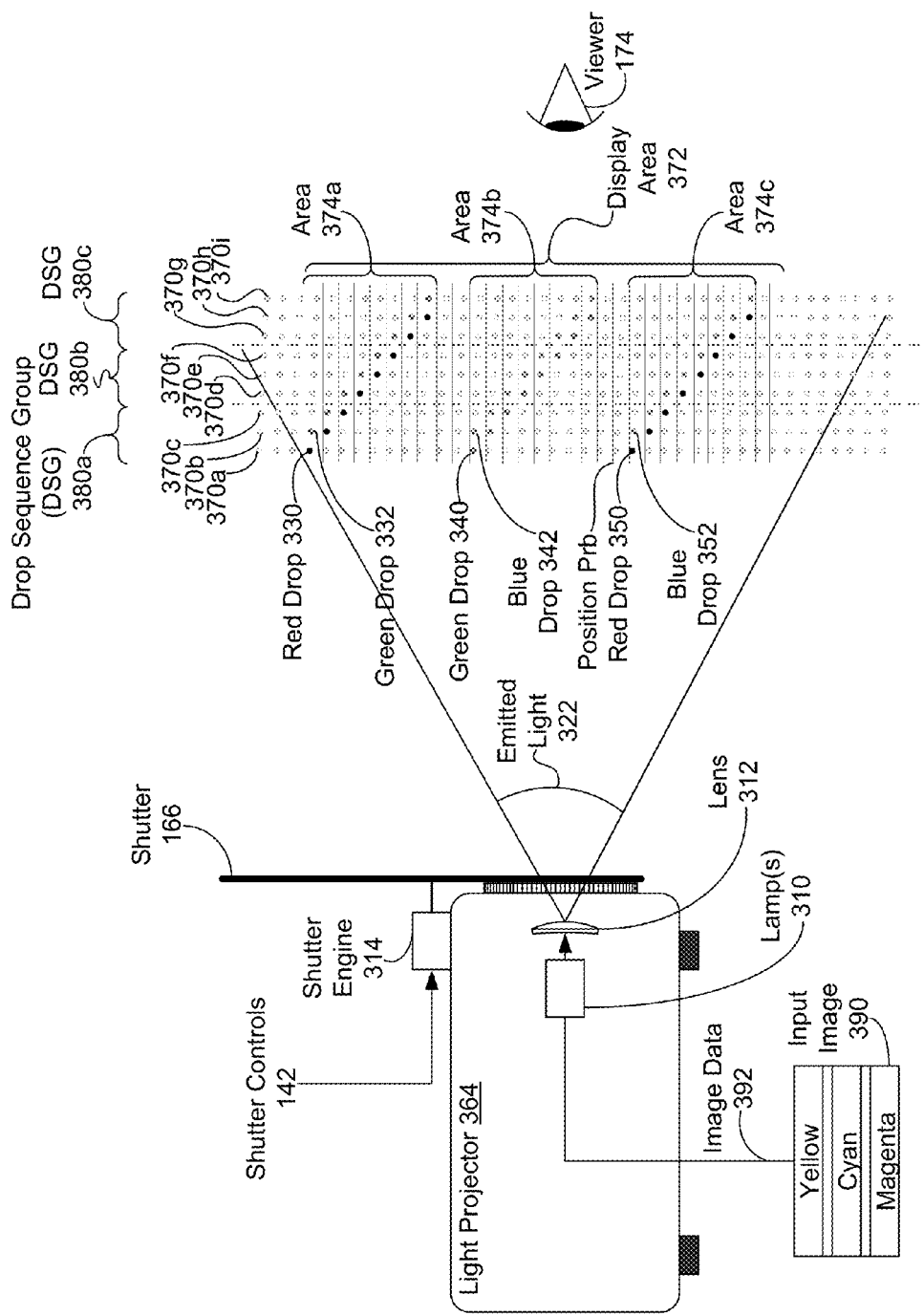
FIG. 3B is a diagram of another light projector, in accordance with an example embodiment.

FIG. 3B is a diagram of light projector 364, in accordance with an example embodiment, showing display of multiple drops of light colored at various positions of display area 372. As with light projector 164 shown in FIG. 3A, light projector 364 can include shutter 166, lamp(s) 310, lens 312, and shutter engine 314. Light projector 364 can emit emitted light 322 using lamp(s) 310 and 312. Emitted light 322 reaches drop sequences 370a-370h and illuminates drops within the drop sequences, as discussed above at least in the context of light emitted of light projector 164 of FIG. 3A.

Light projector 364 can emit multiple colors of light onto nearby drops. For example, at a top-most position of drop sequences 370a-370i shown in FIG. 3B (shown as the top-most line through drop sequences 370a-370i), a red drop 330 in drop sequence 370a, with red drops shown in black within FIG. 3B, can be illuminated using red light and a green drop 332 in drop sequence 370b, with green drops shown in darker-grey within FIG. 3B, can be illuminated using green light. Then, from a point of view of viewer 174 looking at display area 372, red drop 330 and green drop 332 can be appear to be overlapping at the top-most position. Then, the appearance of overlapping drops 330 and 332 may appear to be a yellow drop at the top-most position, according to the property of additive light for the primary colors of red and green. The yellow drop at the top of display area 372 corresponds to a portion of a yellow stripe at the top of input image 390. As shown in FIG. 3A, illuminated drops in positions within upper area 374a of display area 372 include a diagonal line of red drops including red drop 330 and a corresponding diagonal line of green drops including green drop 332. Then, from the point of view of viewer 174, the two diagonal lines of illuminated drops within upper area 374a may appear to be a line of yellow drops in area 374a, as directed by image data 392. This line of yellow drops in upper area 374a of display area 372 can correspond to the top-most yellow stripe of input image 390.

Similarly, emitted light 322 can illuminate drops within area 374b of display area 372 to include a diagonal line of green drops including green drop 340 and a corresponding diagonal line of blue drops including blue drop 342, where blue drops shown in lighter-grey within FIG. 3B. Then, based on additive light of green and blue lights, from the point of view of viewer 174, the two diagonal lines of illuminated drops within middle area 374b of display area 372 may appear to be a line of cyan drops in area 374b. This line of cyan drops in middle area 374b of display area 372 can correspond to the middle cyan stripe of input image 390.

Also, emitted light 322 can illuminate drops within area 374c of display area 372 to include a diagonal line of red drops including red drop 350 and a corresponding diagonal line of blue drops including blue drop 352. Then, based on additive light of red and blue lights, from the point of view of viewer 174, the two diagonal lines of illuminated drops within lower area 374c of display area 372 may appear to be a line of magenta drops in area 374b. This line of magenta drops in lower area 374b of display area 372 can correspond to the lower magenta stripe of input image 390.

Intensity and ranges of colors displayed in display area 372 can be controlled by illuminating multiple drops among drop sequences 370a. As one example, to make a display appear red at a given position within display area 372, one drop of drop sequences 370a-370i can be illuminated with red light. To add intensity to the color displayed, multiple drops at the same position can be illuminated; for the previous example of a displaying a red display at the given position, two or more drops of drop sequences 370a-370i can be illuminated with red light. Lighting of multiple drops with red light may make the given position of display area 372 appear more intensely red; i.e., appear to be more saturated with red color, than when one drop of drop sequences 370a-370i is illuminated with red light.

Mixing of colors can involve multiple illuminated drops at a position of display area 372. For example, additive mixing of equal amounts of red and blue light; e.g., at the position Prb of FIG. 3B with red drop 350 and blue drop 352, leads to a resulting color of magenta. If the resulting color is intended to have more red than magenta, then more drops in drop sequences 370a-370i can be illuminated with red light than with blue light; e.g., three drops can be illuminated with red light and two drops can be illuminated at blue light at position Prb.

In some embodiments, lamp(s) 310 can be configured to emit different colors of light on different drop sequence groups (DSGs). FIG. 3B shows three examples of drop sequence groups: drop sequence group 380*a* that include drop sequences 370*a*, 370*b*, and 370*c*, drop sequence group 380*b* that include drop sequences 370*d*, 370*e*, and 370*f*, and drop sequence group 380*c* that include drop sequences 370*g*, 370*h*, and 370*i*. FIG. 3B also shows each drop sequence group 380*a*, 380*b*, and 380*c* separated by grey dashed lines.

As an example of these embodiments, lamp(s) 310 can be configured to: (a) illuminate drops in drop sequence group 380*a*, with drops in drop sequences 370*a*, 370*b*, and 370*c* with one color of light; e.g., red; (b) illuminate drops in drop sequence group 380*b*, with drops in drop sequences 370*d*, 370*e*, and 370*f* with one color of light; e.g., green; and (c) illuminate drops in drop sequence group 380*c*, with drops in drop sequences 370*g*, 370*h*, and 370*i* with one color of light; e.g., blue. Using drops colored in each drop sequence group and properties of additive light can enable light projector 364 to provide a wide range of colors and color intensities to viewer 174 along positions of display area 372.

Figure 4A:
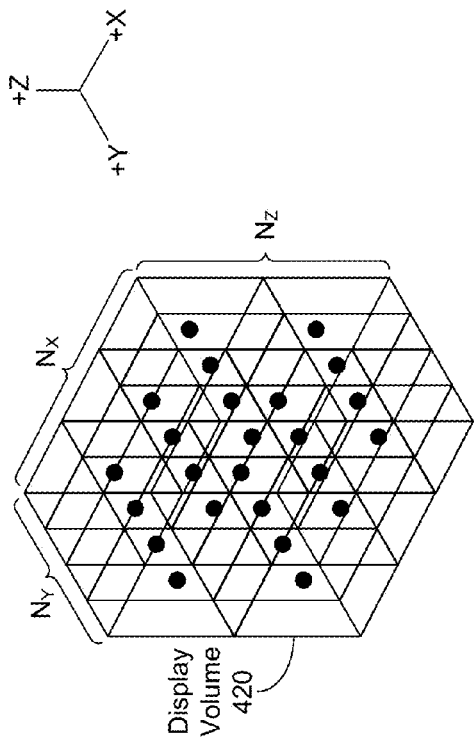
FIG. 4A is a diagram of a display cell and a display volume made of display cells, in accordance with an example embodiment.
Figure 4A:
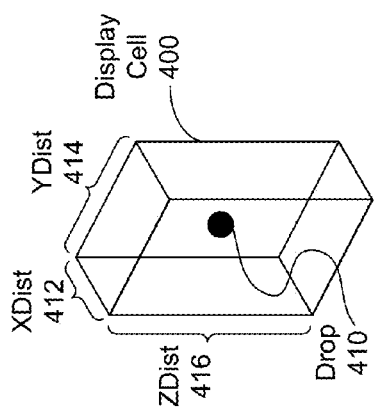

FIG. 4A is a diagram of display cell 400 and display volume 420 made of display cells, in accordance with an example embodiment. Display cell 400 can include a drop, such as drop 410, within a region having a width of Xdist 412, a depth of Ydist 414, and a height of Zdist 416, and thus having a volume of Xdist*Ydist*Zdist. In some examples, a display cell for one drop D, such as drop 410 can be a volume bounding drop D while drop D falls Zdist units of distance.

Display cells can be grouped into a display volume. FIG. 4A shows display volume 420 having $N_X*N_Y*N_Z 3*4*2=24$ display cells. For example, display volume 420 can be a cross section of $N_X*N_Y$ drop sequences that includes N drops traveling in succession. The $N_X*N_Y$ drop sequences can be generated by a system, such as system 100 or system 200, with a fluid-drop head with an array of at least $N_X*N_Y$ nozzles in a position to allow at least $N_Z$ drops to travel in succession.

Drop 410 can be comprised of one or more fluids, such as, but not limited to, water, dye, milk, and oil. In some cases, drop 410 can act as a diffuse reflector of incoming light and so reflect light striking the drops in all directions equally. In other cases, drop 410 can be colored or otherwise treated to absorb some colors of light and so reflect only a portion of light striking the drops. In still other cases; drop 410 can be dyed or otherwise treated to generate visible light when struck with non-visible light; e.g., the fluid making up drop 410 can include an ultraviolet dye that emits visible light when struck by non-visible ultraviolet light. Many other possibilities for fluids making up drop 410 and other properties when various frequencies of light strike drop 410.

Figure 4B:
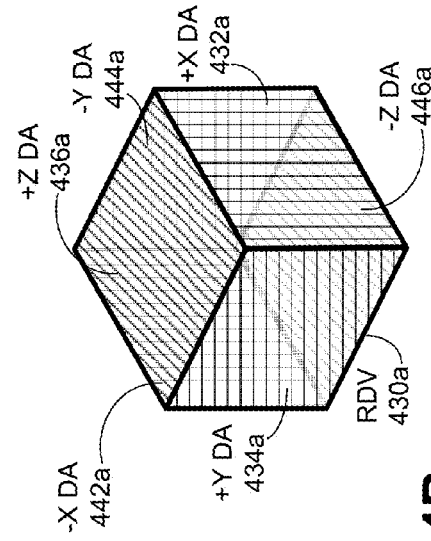
FIG. 4B is a diagram of two different display volumes, in accordance with an example embodiment.
Figure 4B:
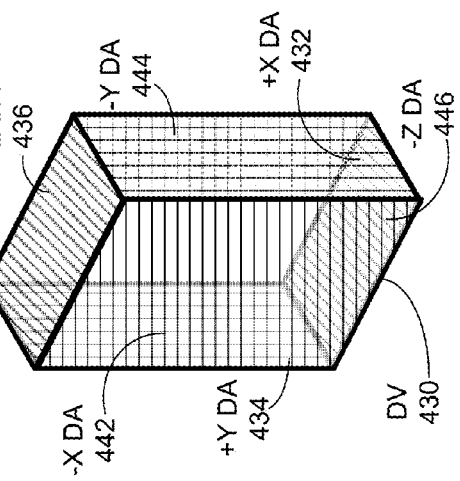

FIG. 4B is a diagram of two different display volumes 430, 430*a*, in accordance with an example embodiment. Display volume (DV) 430 is a rectangular volume with six display areas (DAs): +X display area 432, +Y display area 434, -1-Z display area 436, -X display area 442, -Y display area 444, and -Z display area 446. Each display area 432-446 is labeled in FIG. 4B in accordance with the axes shown in the upper-left portion of the sheet depicting FIG. 4B. Display areas in display volume 430 can have differing sizes; e.g., FIG. 4B shows that +Y display area 434 is larger in area than either +Z display area 436 or +X display area 432.

Light striking drops in display volume 430 (drops not shown in FIG. 4B) can form one or more of display areas 432, 434, 436, 442, 444, and 446. A display area can be illuminated by light displayed using a light projector; e.g., light projector 164, 364, to generate light for illuminating the display area. In some embodiments, light projected onto a display area can be projected along an axis perpendicular to the display area; e.g., to project an image onto +Y display area 434, the light can travel along, or nearly along, a +Y or -Y axis, as both +Y and -Y axes are perpendicular to +Y display area 434.

Regular display volume (RDV) 430*a* is similar to display volume 430, except that each display area of a regular display volume; e.g., display areas 432*a*, 434*a*, 436*a*, 442*a*, 444*a*, and 446*a* of display volume 430*a*, are all have substantially the same-sized area. Two display areas DA1 and DA2 have substantially the same-sized area if DA1 and DA2 each have respective areas A1 and A2 whose sizes are within a threshold T number or percentage of area units of each other; e.g., area units being square inches, square centimeters, etc.

For example, suppose display area 432*a* is 10 area units in size and threshold T is one area unit. Then if each display areas 434*a*, 436*a*, 442*a*, 444*a*, and 446*a* is between 9.5 and 10.5 area units in size, then the maximum difference between areas of display areas 432*a*, 434*a*, 436*a*, 442*a*, 444*a*, 446*a* is one. Then, since the maximum difference between area sizes of display areas 432*a*, 434*a*, 436*a*, 442*a*, 444*a*, 446*a* is within T area units, the display areas are all substantially the same size. And, since all the display areas of display volume 430*a* are substantially the same size, display volume 430*a* can be considered to be a regular display volume. Other definitions for regular display volumes are possible as well.

In some cases, all drops within in a display volume can be illuminated. In particular, drops in an interior of a display volume can be illuminated as well as drops on a surface of the display volume; e.g., drops in the interior of display volume 430 as well as drops in display areas 432, 434, 436, 442, 444, 446 can be illuminated. Thus, a 3D region of a display volume can be illuminated by illuminating drops in the interior of the display volume and perhaps drops on a display area of the display volume. Therefore, drops in one or more 2D portions of a display volume can be illuminated, such as drops in one or more display areas (ignoring the width of the drops), or drops in one or more 3D portions of a display volume can be illuminated, including but not limited to all drops in the display volume.

FIG. 4C is a diagram of displaying images on X-axis oriented display areas 432*a*, 442*a* of regular display volume 430*a*, in accordance with an example embodiment. In other examples, a display volume that is not regular; e.g., display volume 430, can be used instead of regular display volume 430*a*. Display areas 432*a*, 442*a* are shown in FIG. 4C patterned with vertical lines for emphasis.

Light projectors 452*a* and/or 452*b* can be used to generate light that strikes display areas 432*a* and/or 442*a*. Then, through use of shutters of light projectors 452*a* and/or 452*b* and the stroboscopic effect as discussed above, drops of drop sequences that traverse display areas 432*a* and/or 442*a* can appear to be illuminated in fixed positions with display areas 432*a* and/or 442*a*. Then, a viewer positioned at an appropriate view point; e.g., at a view point of viewer 450*a* or 450*b*, can view imagery projected onto the apparently fixed drops of display areas 432*a* and/or 442*a*.

For example, considering display area 432*a* and a viewer such as viewer 450*a*, light projector 452*a* can front-project an image onto drops of display area 432*a*. Front projection involves emitting light from a light projector; e.g., light projector 452*a*, that illuminates a surface of a display area; e.g., display area 432*a*, facing to a viewer; e.g., viewer 450*a*. In contrast to front projection, light projector 452*b* can back-project an image onto drops of display area 432*a*, where back projection involves emitting light from a tight projector; e.g., light projector 452*b*, that illuminates a surface of a display area; e.g., display area 432*a*, not facing a viewer; e.g., viewer 450*a*. Similarly, from a view point of viewer 450*b*, light projector 452a can back-project an image onto display area 442a and light projector 452b can front-project an image onto display area 442a.

In some cases, a back-projected image from one view point can be a front-projected image from another view point. For example, if light projector 452b generates light 454 that strikes display area 442a to generate an image I1, image I1 can be front-projected onto display area 442a from a view point of viewer 450b. Also, if drops in drop sequences traversing display volume 430a are mostly or completely transparent, image I1 can appear to viewer 450a to be a back-projected image displayed on display area 432a. In other examples, light projector 452b generates light 456 for back-projecting an image I2 onto display area 432a for viewing by viewer 450a. Also, if drops in drop sequences traversing display volume 430a are mostly or completely transparent, image I2 can appear to viewer 450b to be a front-projected image displayed on display area 442a.

As display areas 432a and 442a are X-axis oriented areas, light from light projectors 452a, 452b can be emitted nearly or completely along an X axis, such as shown as part of the axes in an upper-right-hand corner of the sheet that include FIG. 4C. For example, light projector 452a can generate light that travels nearly or completely along a −X direction, and light projector 452b can generate light; e.g., light 454 and light 456, that travels nearly or completely along a +X direction. As such, the generated light can strike display area 432a and/or 442a at a nearly perpendicular or perpendicular direction, and so illuminate drops of fluid in drop sequences that make up display areas 432a, 442a at a number of positions such as discussed above in the context of FIGS. 3A and 3B.

FIG. 4D is a diagram of displaying images on Y-axis oriented display areas 434a, 444a of regular display volume 430a, in accordance with an example embodiment. In other examples, a display volume that is not regular; e.g., display volume 430, can be used instead of regular display volume 430a. Display areas 434a, 444a are shown in FIG. 4D patterned with horizontal lines for emphasis.

Light projectors 452c and/or 452c can be used to generate light that strikes display areas 434a and/or 444a. Then, through use of shutters of light projectors 452c and/or 452d and the stroboscopic effect as discussed above, drops of drop sequences that traverse display areas 434a and/or 444a can appear to be illuminated in fixed positions with display areas 434a and/or 444a. Then, a viewer positioned at an appropriate view point; e.g., at a view point of viewer 450c or 450d, can view imagery projected onto the apparently fixed drops of display areas 434a and/or 444a. Light projectors 452c and 452d can front-project and back-project images onto display areas, such as display areas 434a and 444a, for viewers at different viewpoints, such as viewers 450c and 450d, as discussed above in the context of FIG. 4C.

As display areas 434a and 444a are Y-axis oriented areas, light from light projectors 452c, 452d can be emitted nearly or completely along an Y axis, such as shown as part of the axes in an upper-right-hand corner of the sheet that includes FIG. 4D. For example, light projector 452c can generate light that travels nearly or completely along a −Y direction, and light projector 452d can generate light that travels nearly or completely along a +Y direction. As such, the generated light can strike display area 434a and/or 444a at a nearly perpendicular or perpendicular direction, and so illuminate drops of fluid in drop sequences that make up display areas 434a, 444a at a number of positions such as discussed above in the context of FIGS. 3A and 3B.

FIG. 4E is a diagram of displaying images on Z-axis oriented display areas 436a, 446a of regular display volume 430a, in accordance with an example embodiment. In other examples, a display volume that is not regular; e.g., display volume 430; can be used instead of regular display volume 430a. Display areas 436a, 446a are shown in FIG. 4E patterned with diagonal lines for emphasis.

Light projectors 452e and/or 452f can be used to generate light that strikes display areas 436a and/or 446a. Then, through use of shutters of light projectors 452e and/or 452f and the stroboscopic effect as discussed above, drops of drop sequences that traverse display areas 436a and/or 446a can appear to be illuminated in fixed positions with display areas 436a and/or 446a. Then, a viewer positioned at an appropriate view point; e.g., at a view point of viewer 450e or 450f, can view imagery projected onto the apparently fixed drops of display areas 436a and/or 446a. Light projectors 452e and 452f can front-project and back-project images onto display areas, such as display areas 436a and 446a, for viewers at different viewpoints, such as viewers 450e and 450f, as discussed above in the context of FIG. 4C.

As display areas 436a and 446a are Z-axis oriented areas, light from light projectors 452e, 452f can be emitted nearly or completely along a Z axis, such as shown as part of the axes in an upper-right-hand corner of the sheet that includes FIG. 4E. For example, light projector 452e can generate light that travels nearly or completely along a −Z direction, and light projector 452f can generate light that travels nearly or completely along a +Z direction. As such, the generated light can strike display area 436a and/or 446a at a nearly perpendicular or perpendicular direction, and so illuminate drops of fluid in drop sequences that make up display areas 436a, 446a at a number of positions such as discussed above in the context of FIGS. 3A and 3B.

In other embodiments, light projectors from multiple axial orientations can be utilized to emit tight onto a display volume. For example, some or all of light projectors 452a, 452b, 452c, 452d, 452e, and 452f can emit light simultaneously that strikes display volume 430a, and so provide X-axis oriented images on X-axis oriented display areas, Y-axis oriented images on Y-axis oriented display areas, and/or Z-axis oriented images on Z-axis oriented display areas at the same time. In still other embodiments, a light projector may be oriented at an angle other than a perpendicular angle to a display area; e.g., emit light that strikes a display area at a non-right angle. In even other embodiments, a light projector may be oriented to emit light that strikes multiple display areas simultaneously; e.g., emit light that strikes an edge or corner of a display volume and so can illuminate two or more display areas at the same time, such as illuminating two display areas that come together at an edge of the display volume or illuminating three display areas that come together at a corner of the display volume.

In yet other embodiments, nozzles that generate drop sequences can be arranged in patterns other than in a 2D rectangular array; e.g., such as an array of nozzles shown in fluid-drop head 110 as part of FIG. 1. For examples, the nozzles can be arranged as in a circular pattern in two dimensions, a partially-spherical pattern in three dimensions, a rectangular or cubic pattern in three dimensions, as curves/lines in one, two, or three dimensions, as a single nozzle, or in other pattern(s) in one, two, and/or three dimensions (3D). As such, nozzles arranged in patterns other than in a two-dimensional rectangular array may generate drop sequences that occupy a display volume with display area(s) that make it difficult or impossible to orient light projector(s) to be perpendicular to these display area(s). Then, light projectors may be configured to emit light at right angles to part, but not all, of these display areas and/or be configured to emit light at angles other than right angles to these display areas.

III. Example Operations

Figure 5:
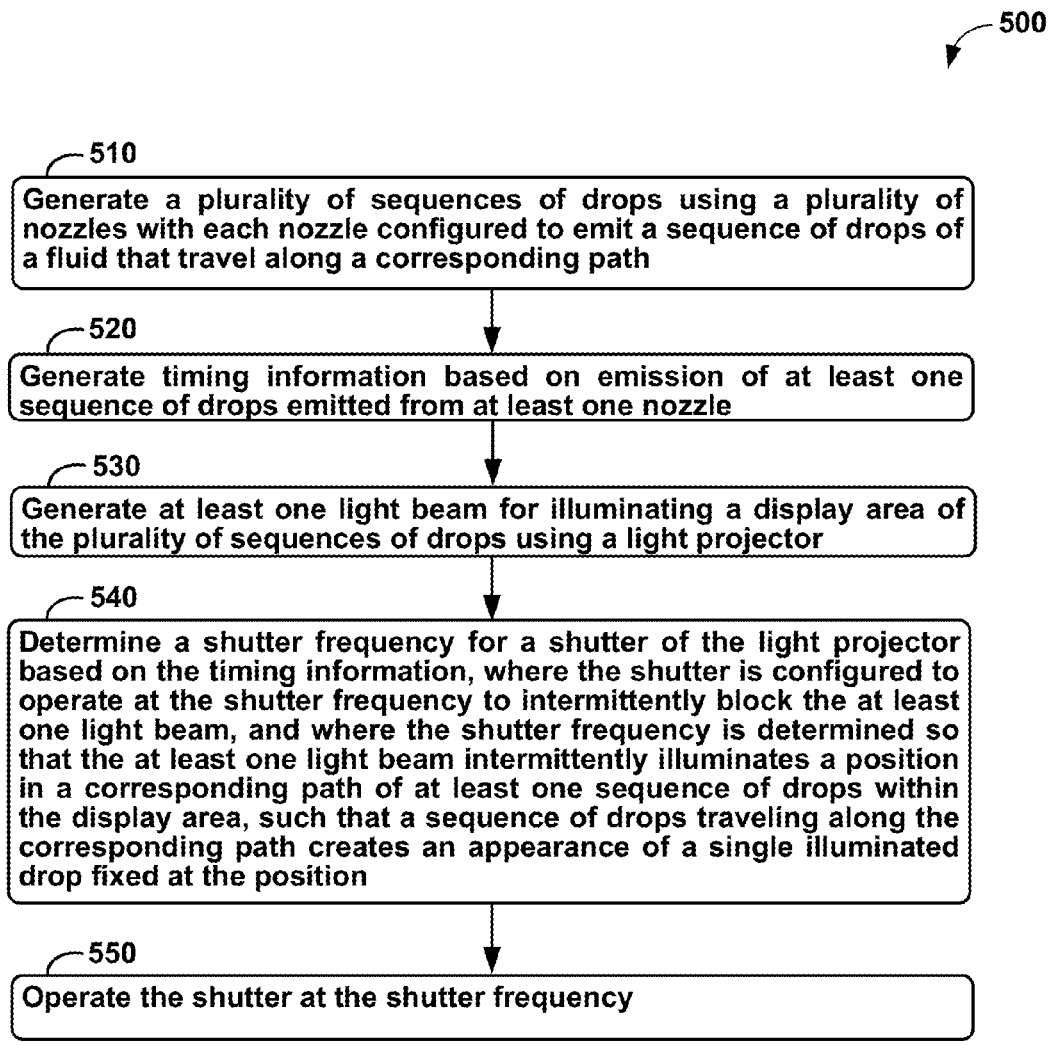
FIG. 5 is a flowchart of a method, in accordance with an example embodiment.

FIG. 5 is a flowchart of a method 500, in accordance with an example embodiment. Method 500 can be performed by part or all of a system, such as system 100 discussed above in the context of at least FIG. 1, system 200 discussed above in the context of at least FIG. 2A, or system 280 discussed above in the context of at least FIG. 2B.

Method 500 can begin at block 510, where a plurality of nozzles can generate a plurality of sequences of drops of a fluid. Each nozzle can be configured to emit a sequence of drops of a fluid that travel along a corresponding path, such as discussed in the context of at least FIGS. 1, 2A, and 29. In some embodiments, a fluid-drop head, such as fluid-drop head 100, can include the plurality of nozzles. In other embodiments, the plurality of nozzles can be arranged to emit a two-dimensional array of sequences of drops. The two-dimensional array can be specified in terms of a first dimension and a second dimension. Then, generating the plurality of sequences of drops can include generating the plurality of sequences of drops such that the drops in each sequence of the plurality of sequence are configured to travel in a third dimension, where each of the first dimension, the second dimension, and the third dimension is a different dimension. In other embodiments, the fluid can include water.

At block 520, timing information can be generated based on emission of at least one sequence of drops emitted from at least one nozzle, such as by timing system 150. In some embodiments, the timing information can indicate a drop rate for drops in the at least one sequence of drops. In particular embodiments, a drop detector can be configured to determine the drop rate for the drops in the at least one sequence of drops.

At block 530, a light projector, such as light projector 164, 264a, 264b, 264c, or 364, can generate at least one light beam for illuminating a display area of the plurality of sequences of drops. In some embodiments, the light projector can be configured with a first light source and a second light source. The first light source can emit light onto a first plane of the plurality of sequences lying in the first dimension and the third dimension. The second light source can emit light onto a second plane of the plurality of sequences lying in the second dimension and the third dimension.

In other embodiments, generating the at least one light beam for illuminating the display area of the plurality of sequences of drops can include: emitting a first color of light onto a first portion of the display area and emitting a second color of light onto a second portion of the display area, where the first color and the second color differ, and where the first portion and the second portion differ. In still other embodiments, generating the at least one light beam for illuminating the display area of the plurality of sequences of drops includes projecting a real-time display onto the portion of the plurality of streams of the fluid using the at least one light beam.

In even other embodiments, the light projector can include at least a red light source configured to emit red light, a green light source configured to emit green light, and a blue light source configured to emit blue light. In still other embodiments, the light projector can include at least two light sources, where the at least two light sources are located at least two different positions. In particular of the still other embodiments, each of the at least two light sources can be configured to emit different colors of light, and wherein the at least two different positions are selected so that the drops in at least a portion of at least one designated sequence of drops are lighted by two or more light sources of the at least two light sources simultaneously.

In other particular of the still other embodiments, each of the at least two light sources can be configured to emit different colors of light, where drops in a portion of at least a first sequence of drops can be lighted with a first color of light from a first light source of the two or more light sources, where drops in a portion of at least a second sequence of drops can be lighted with a second color of light from a second light source of the two or more light sources, where the first color of light can differ from the second color of light, and where the drops in the portion of the at least the first sequence of drops can be lighted simultaneously with the drops in the portion of the at least the second sequence of drops. In more particular of these embodiments, the drops in the portion of the at least the first sequence of drops and the drops in the portion of the at least the second sequence of drops can be illuminated to give the appearance of a third color of light, where the third color of light appears to be a combination of the first color of light and the second color of light.

In yet other embodiments, the light projector can be configured to emit ultraviolet light and the fluid can include a dye configured to emit visible light after being excited by ultraviolet light. In yet even other embodiments, the light projector can include a laser.

At block 540, a shutter frequency for a shutter of the light projector, such as shutter 166, can be determined based on the timing information. For example, the shutter frequency can be determined by timing system 150. The shutter can be configured to operate at the shutter frequency to intermittently block the at least one light beam from illuminating the display area. The shutter frequency can be determined so that the at least one light beam intermittently illuminates a position in a corresponding path of at least one sequence of drops within the display area, such that a sequence of drops traveling along the corresponding path creates an appearance of a single illuminated drop fixed at the position.

In some embodiments, the shutter frequency can be based upon the drop rate. In other embodiments, determining the shutter frequency can include both determining a change in the drop rate, and adjusting the shutter frequency based on the change in the drop rate. In other embodiments, the shutter can include a disk configured to rotate at the shutter frequency to intermittently block the at least one light beam from illuminating the display area. In still other embodiments, the shutter can include comprises an LCD configured to operate at the shutter frequency to intermittently block the at least one light beam from illuminating the display area. In even other embodiments, the shutter can include a sensor configured to determine an actual shutter frequency. Then, the shutter frequency can be adjusted based on the actual shutter frequency.

At block 550, the shutter can be operated at the shutter frequency. In some embodiments, method 500 can further include storing the fluid in a fluid reservoir, such as fluid reservoir 120. A catchment, such as catchment 130, can collect the drops emitted from the plurality of nozzles as a pool of the fluid. A first tube, such as tube 132, can connect the fluid reservoir and the fluid-drop head. A second tube, such as tube 134, can connect the catchment and fluid reservoir, and can convey fluid from the pool of the fluid to the fluid reservoir. In particular embodiments, method 500 can further include moving the fluid from the fluid reservoir to the fluid-drop head via the first tube using a pump, such as pump 116.

In other embodiments, method 500 can further include: receiving an input image including a plurality of pixels; generating a pixel/drop mapping to relate pixels in the input image to drops of the plurality of sequences of drops; and controlling the at least one light beam based on the pixel/drop mapping, such as discussed above at least in the context of FIG. 2B.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information, such as a block of method 600 described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system, comprising:
a plurality of nozzles, wherein each nozzle is configured to emit a sequence of drops of a fluid that travel along a corresponding path;
a light projector, configured to generate at least one light beam for illuminating a display area of the plurality of sequences of drops;
a shutter for the light projector, configured to operate at a shutter frequency to intermittently block the at least one light beam from illuminating the display area; and
a control system, configured to
generate timing information based on emission of at least one sequence of drops from at least one nozzle,
determine the shutter frequency based on the timing information, wherein operation of the shutter at the shutter frequency causes the at least one light beam to intermittently illuminate a position in a corresponding path of at least one sequence of drops within the display area, such that a sequence of drops traveling along the corresponding path creates an appearance of a single illuminated drop fixed at the position, and
operate the shutter at the shutter frequency.

2. The system of claim 1, wherein the system further comprises:
a fluid-drop head comprising at least one nozzle of the plurality of nozzles;
a fluid reservoir, configured to store the fluid;
a catchment, configured to collect the drops emitted from the plurality of nozzles as a pool of the fluid;
a first tube connecting the fluid reservoir and the fluid-drop head; and
a second tube connecting the catchment and fluid reservoir, and configured to convey fluid from the pool of the fluid to the fluid reservoir.

3. The system of claim 2, further comprising a pump, wherein the pump is configured to move the fluid from the fluid reservoir to the fluid-drop head via the first tube.

4. The system of claim 1, wherein the timing information indicates a drop rate for drops in the at least one sequence of drops.

5. The system of claim 4, further comprising a drop detector configured to determine the drop rate for the drops in the at least one sequence of drops.

6. The system of claim 4, wherein the shutter frequency is based upon the drop rate.

7. The system of claim 4, wherein the control system is further configured to determine a change in the drop rate and adjust the shutter frequency based on the change in the drop rate.

8. The system of claim 1, wherein the shutter comprises a disk configured to rotate at the shutter frequency to intermittently block the at least one light beam from illuminating the display area.

9. The system of claim 1, wherein the shutter comprises a liquid crystal display (LCD) configured to operate at the shutter frequency to intermittently block the at least one light beam from illuminating the display area.

10. The system of claim 1, wherein the light projector comprises at least a red light source configured to emit red light, a green light source configured to emit green light, and a blue light source configured to emit blue light.

11. The system of claim 1, wherein the light projector comprises at least two light sources, and wherein the at least two light sources are located at least two different positions.

12. The system of claim 11, wherein each of the at least two light sources are configured to emit different colors of light, and wherein the at least two different positions are selected so that the drops in at least a portion of at least one designated sequence of drops are lighted by two or more light sources of the at least two light sources simultaneously.

13. The system of claim 11, wherein each of the at least two light sources are configured to emit different colors of light, wherein drops in a portion of at least a first sequence of drops are lighted with a first color of light from a first light source of the two or more light sources, wherein drops in a portion of at least a second sequence of drops are lighted with a second color of light from a second light source of the two or more light sources, wherein the first color of light differs from the second color of light, and wherein the drops in the portion of the at least the first sequence of drops are lighted simultaneously with the drops in the portion of the at least the second sequence of drops.

14. The system of claim 11, wherein the drops in the portion of the at least the first sequence of drops and the drops in the portion of the at least the second sequence of drops are illuminated to give the appearance of a third color of light, and wherein the third color of light appears to be a combination of the first color of light and the second color of light.

15. The system of claim 1, wherein the light projector is configured to emit ultraviolet light, and wherein the fluid comprises a dye configured to emit visible light after being excited by ultraviolet light.

16. The system of claim 1, wherein the light projector comprises a laser.

17. The system of claim 1, wherein the shutter comprises a sensor configured to determine an actual shutter frequency, and wherein the control system is configured to adjust the shutter frequency based on the actual shutter frequency.

18. The system of claim 1, wherein the plurality of nozzles are arranged to emit a two-dimensional array of sequences of drops.

19. The system of claim 1, wherein the fluid comprises water.

20. The system of claim 1, wherein the control system is further configured to:
receive an input image comprising a plurality of pixels,
generate a pixel/drop mapping to relate pixels in the input image with drops of the plurality of sequences of drops, and
control the at least one light beam based on the pixel/drop mapping.

21. A method, comprising:
generating a plurality of sequences of drops using a plurality of nozzles, each nozzle configured to emit a sequence of drops of a fluid that travel along a corresponding path;
generating timing information based on emission of at least one sequence of drops emitted from at least one nozzle;
generating at least one light beam for illuminating a display area of the plurality of sequences of drops using a light projector;
determining a shutter frequency for a shutter of the light projector based on the timing information, wherein the shutter is configured to operate at the shutter frequency to intermittently block the at least one light beam from illuminating the display area, and wherein the shutter frequency is determined so that the at least one light beam intermittently illuminates a position in a corresponding path of at least one sequence of drops within the display area, such that a sequence of drops traveling along the corresponding path creates an appearance of a single illuminated drop fixed at the position; and
operating the shutter at the shutter frequency.

22. The method of claim 21, wherein the plurality of nozzles are arranged to emit a two-dimensional array of sequences of drops specified in terms of a first dimension and a second dimension, and wherein generating the plurality of sequences of drops comprises generating the plurality of sequences of drops such that the drops in each sequence of the plurality of sequence are configured to fall in a third dimension, and wherein each of the first dimension, the second dimension, and the third dimension is a different dimension.

23. The method of claim 22, wherein the light projector is configured with a first light source to emit light onto a first plane of the plurality of sequences lying in the first dimension and the third dimension, and with a second light source to emit light onto a second plane of the plurality of sequences lying in the second dimension and the third dimension.

24. The method of claim 21, wherein generating the at least one light beam for illuminating the display area of the plurality of sequences of drops comprises:
emitting a first color of light onto a first portion of the display area; and
emitting a second color of light onto a second portion of the display area, wherein the first color and the second color differ, and wherein the first portion and the second portion differ.

25. The method of claim 21, wherein generating the at least one light beam for illuminating the display area of the plurality of sequences of drops comprises projecting a real-time display onto the portion of the plurality of streams of the fluid using the at least one light beam.

26. The method of claim 21, further comprising:
receiving an input image comprising a plurality of pixels;
generating a pixel/drop mapping to relate pixels in the input image to drops of the plurality of sequences of drops; and
controlling the at least one light beam based on the pixel/drop mapping.

* * * * *